No. 863,760.   PATENTED AUG. 20, 1907.
E. E. SCHACHNER.
FIREPROOF STAIR STRUCTURE.
APPLICATION FILED APR. 16, 1907.

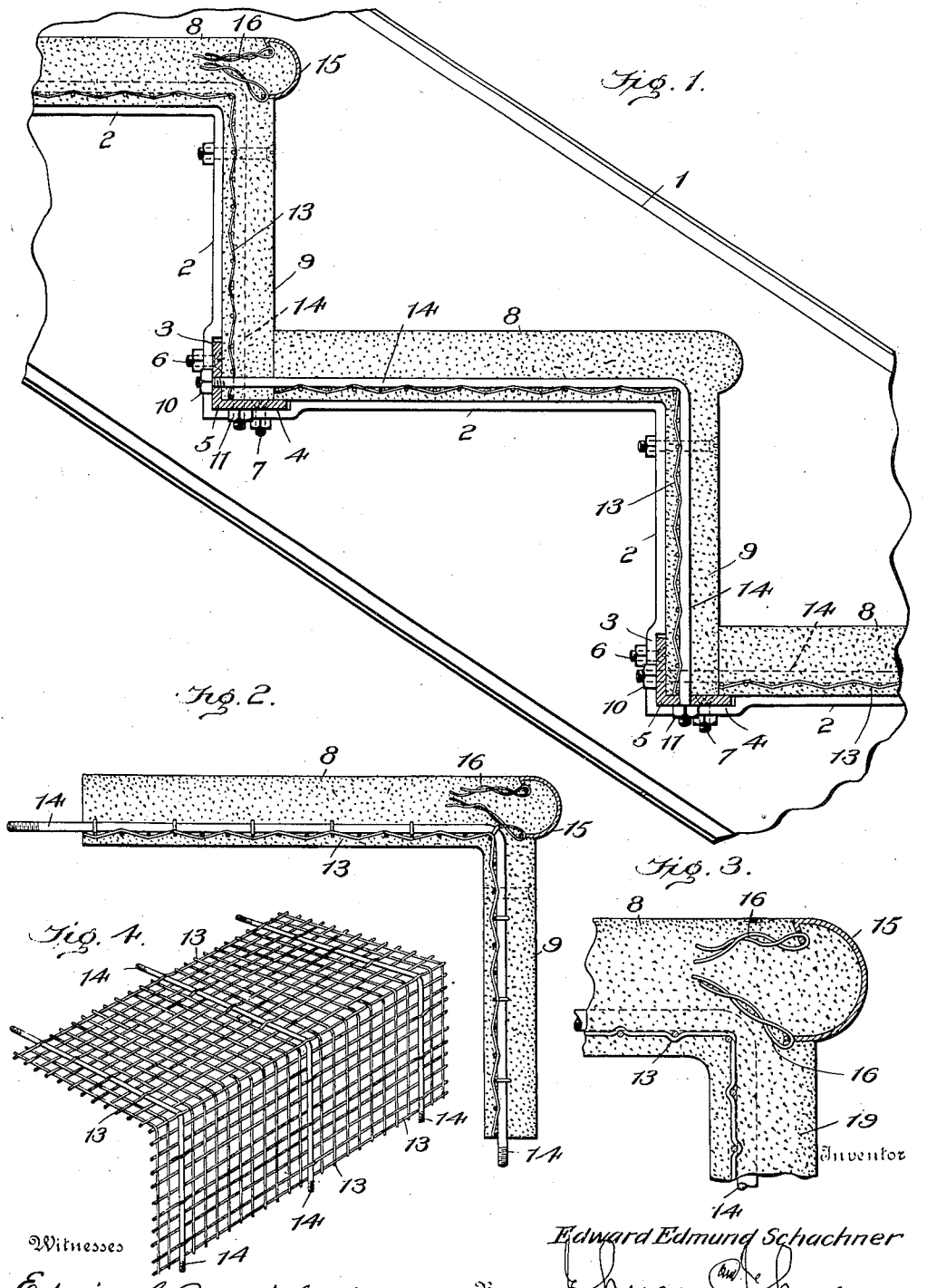

2 SHEETS—SHEET 2.

Witnesses
Edwin L. Bradford
Anne B. Johnson

Inventor
Edward Edmund Schachner
By Johnson & Johnson
Attorneys.

UNITED STATES PATENT OFFICE.

EDWARD EDMUND SCHACHNER, OF DENVER, COLORADO.

FIREPROOF STAIR STRUCTURE.

No. 863,760.  Specification of Letters Patent.  Patented Aug. 20, 1907.

Application filed April 16, 1907. Serial No. 368,477.

*To all whom it may concern:*

Be it known that I, EDWARD EDMUND SCHACHNER, a citizen of the United States, residing at the city and county of Denver and State of Colorado, have invented certain new and useful Improvements in Fireproof Stair Structures; and I do hereby declare the following to be a full, clear, and exact description of the invention, such as will enable others skilled in the art to which it appertains to make and use the same.

The invention herein resides in the production of a stair step of molded tread and riser of plastic material as an entirety; in provision for reinforcing said molded body as an entirety; and in the provision of means whereby the reinforcing means are secured at the inner edge of the tread and at the lower edge of the riser to the walls of the stair stringers; and in the claims appended hereto I will point out the parts and combination of parts which constitute my invention in connection with the accompanying drawings, in which,—

Figure 5:
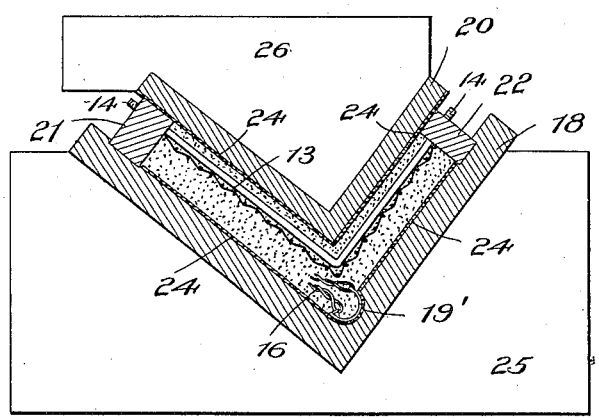
Figure 6:
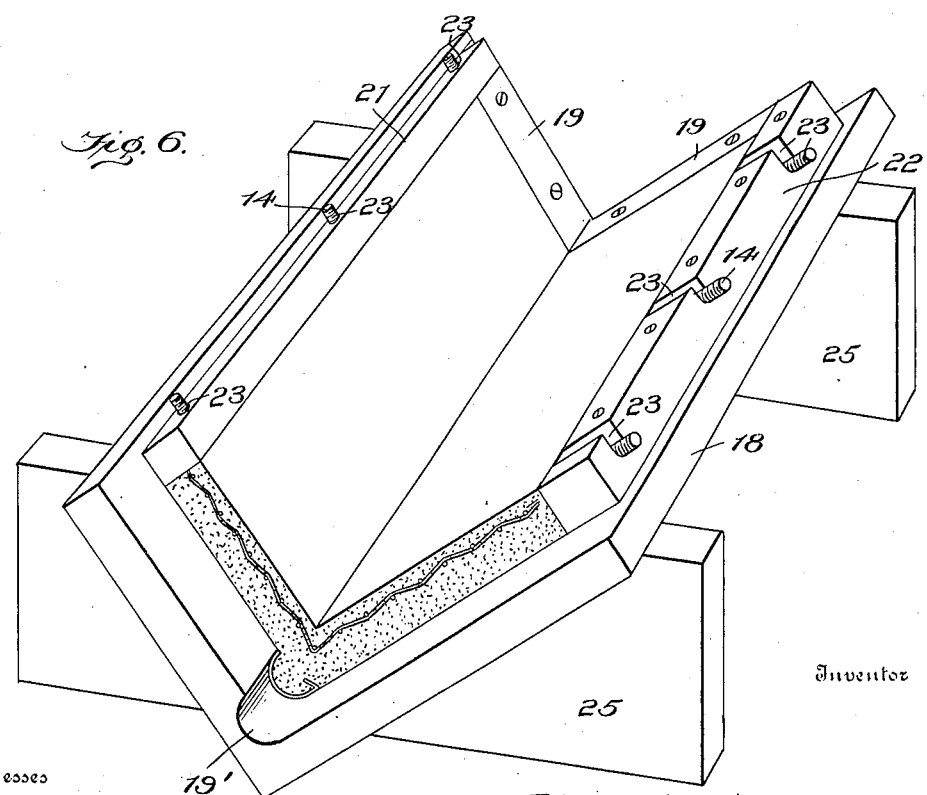

Figure 1 represents in vertical section so much of a stair structure as illustrates my invention. Fig. 2 shows the reinforced molded stair tread and riser as an entirety. Fig. 3 is an enlarged portion in section of the tread-nose and riser showing the anchoring of the metallic nose-shield. Fig. 4 shows the reinforcing trellis. Fig. 5 shows in section a mold and the reinforced tread and riser molded therein. Fig. 6 shows the base section of the mold and the tread and riser formed therein ready to receive the compressing top section.

I have shown my molded stair tread and riser as designed for use in a fireproof stair structure such as shown, but it is only deemed necessary to particularly describe such parts of the structure as constitute the housing and supporting parts of the integral molded tread and riser and its connections with the stair structure.

The stair supporting stringers 1, are preferably of steel having horizontal and vertical flanges or ribs 2, 2, on their inner walls corresponding to the step-treads and risers of the stair and I prefer to make them continuous. At their angular junction at the rear edge of the tread these flanges are formed each with an offset or depression 3, and 4, making in both flanges an L shaped recess within which is fitted the end of a corresponding angle-bar 5, there being an identical recess formed by wall flanges on the opposite stringer to receive the other end of said angle-bar. Each end of these angle-bars is secured to said stringer flanges within said angular recess by nutted bolts 6 and 7 whereby the stringers are tied together.

I have shown and prefer the step treads 8, abutting the vertical walls of the risers 9; while the risers are seated upon the horizontal and against the vertical walls of the angle-bars. The tread and the riser are molded as an entirety fitting the angle of the horizontal and vertical flanges of the stringers, and to increase the strength and stiffness of the molded body it is reinforced by a metallic trellis 13, embedded as a continuous brace in the tread and in the riser. This trellis bracing may be supplemented by a plurality of embedded rods 14, having the angular form of the tread and the riser and which are important in bracing the molded body at its angle. While these rods may be separate from the trellis I prefer to form them with and as parts of the trellis frame and for this purpose they are preferably partially interwoven with the wires which form the trellis frame. These rods also serve the important function of fastening the treads and the risers together at their junction and also of fastening both at their junction to the angle tie bars and through them to the stair stringers. For this purpose the tread branches of these rods project beyond the inner edge of the tread and are passed through bores in the lower end of the riser and in the vertical side of the angle-bar and are screw-threaded and fastened to the angle-bar by nuts 10. The other ends of said rods project from the lower end of the riser and through holes in the horizontal side of the angle-bar and are fastened thereto by nuts 11. These reinforcing rods therefore, whether they are connected with or independent of the trellis frame, are embedded with it in the molding of the tread and riser and have each the function of a bolt to fasten both the tread and its integral riser to the angle-tie-bars in pairs and by this means all the molded steps are fastened to the stringers and give firmness to the stair structure and so far as I know and can find I am the first to employ a reinforcing trellis or rods embedded in a molded concrete tread and riser as the means of fastening them together at their abutting ends and to angle supports by which the stringers are tied together and the separate molded bodies continuously connected and braced from step to step.

The reinforcing and bolting rods when formed as integral parts of the trellis-frame, are preferably passed through and interlocked with the trellis wires, in their straight form about two feet six inches apart and subsequently bent to conform to the angle of the molded tread and riser as in Fig. 4, but the trellis-frame and the reinforcing rods may be arranged and formed in any way that will adapt them as reinforcing and bolting elements for the molded tread and riser. As the nose would be liable to defacement by being chipped I provide it with a facing or shielding plate 15, conforming to the nose and having its edges embedded therein as a means of holding it in place and, as a certain means for this purpose I provide anchoring wires 16, connected to the embedded edges of the shield and embedded in the tread in the molding operation. While I have shown such self fastening metallic nose shield in an integral molded tread and riser of plastic material, obviously such shield may be used for concrete treads that are independent of the riser and while I prefer to use the metallic shield it may be dispensed with. While I prefer to construct the stringers with the continuous wall flanges as a means of supporting and fastening the tread and riser thereon, obviously the stringers may have only the recess forming angle-flanges corresponding to the angle-bar and form a housing and fastening means therefor.

Any suitable mold may be provided for the manufacture of the integral tread and riser and in the drawings I have shown a simple form of mold which may be made of two wooden sections comprising a base section 18, of trough form in cross section the form and size of the integral tread and riser and having bars 19, at each end corresponding to the thickness of the tread and riser. In the molding operation the base section is supported so that it forms a trough and at its angle is formed with a groove 19', the counterpart of the tread-nose and in this groove the metallic nose shield is fitted when the tread nose is to be molded with it as shown in Figs. 5 and 6, and it will be understood that this nose-shield with its anchoring wires is to be fitted within this mold groove so that the plastic body is formed upon it and the shield and wires embedded in it and molded with it and thus made self fastening. That portion of the body which forms the step tread is filled and tamped in upon the base between the end bars and up upon the other side of the trough a certain depth. Upon the surface of this depth of filling the reinforcing trellis frame and its rods, is then laid, and upon this the plastic filling is completed to the level of the end bars and leveled and tamped. The top section 20, is then put in place so that its end bars 21 and 22 will overhang the edges of the tread and of the riser completing and forming a closure for the mold and compressing by suitable means the plastic body into the integral tread and riser as shown in Fig. 5, with or without the self fastened metallic nose shield.

For producing the integral molded tread and riser I may use concrete but I prefer a mixture of about one part of hydraulic cement and about three parts of coarse screened sand, or as required and thoroughly mix the same with water to a plastic condition, and the embedded metallic trellis and rods extending around the angle at the tread nose, allows the molded article to be handled before being thoroughly dried without danger of being broken at the angle or changing the angular relation of the tread and riser.

The end bars of the mold may be fixed, but the side bars may be removable and provided with holes or open slots 23, to receive the ends of the rods which project from the trellis frame when the latter is put in place in the molding operation as seen in Fig. 6. This construction allows the side bars to be placed after the trellis-frame with its rods has been placed; and the space between the end and the side bars with the top part form the molding chamber the size of the desired step and I prefer to have these chamber forming bars on the base section of the mold. The molding surfaces may have a metal lining 24, to prevent the wood absorbing the moisture and render it liable to get out of shape; and the base section may have a pair of supports 25, to prevent the angles of the mold sides from changing; while the top part of the mold may have a handle part 26, to maintain its angular form.

While I prefer the construction shown in the reinforcing rods as the means of fastening the tread and the riser together and to the stringers, obviously the rods may have only a reinforcing function for the tread and riser as an entirety; and it is obvious that the rods in their functions as reinforcing and fastening bolts may be used without the trellis frame in which the mold will hold the rods in their proper relation during the operation of molding.

It will be understood that the stair structure is susceptible of changes in the form, proportions, and minor details of construction which may accordingly be resorted to without departing from the spirit or sacrificing any of the advantages of this invention.

I claim:

1. As a new article of manufacture, a tread and riser for stair-steps molded of plastic material as an entirety and means whereby the inner edge of the tread and the lower edge of the riser are secured to the walls of the stair stringers.

2. As a new article of manufacture, a tread and riser for stair-steps molded together of plastic material the tread and the riser having an embedded continuous reinforcing metallic trellis frame around the angle thereof.

3. As a new article of manufacture, a tread and riser for stair-steps molded of plastic material, the tread and the riser reinforced by an embedded continuous metallic trellis supplemented by a plurality of metallic rods extending unbroken around the angle of the tread and riser, and terminating at the lower edge of the riser and at the rear edge of the tread in projecting fastening ends.

4. In a fireproof stair structure, and in combination a pair of stringers each having flanges on their inner walls corresponding to the angles of the steps, a tread and a riser molded as an entirety of plastic material the counterpart of the stringer flanges, and means for securing the integral tread and riser to the said flanges.

5. In a fireproof stair structure, and in combination a pair of stringers each having flanges on their inner walls corresponding to the angles of the steps, an integral tread and riser molded of plastic material the counterpart of the stringer flanges, and means for securing both ends of the integral tread and riser to the angles of said flanges.

6. As a new article of manufacture, an integral tread and riser for stair steps molded substantially as described and reinforced by a plurality of embedded metallic rods passing around the nose of the tread and extending through the ends of the tread and riser.

7. In a fireproof stair structure, a tread and riser for steps molded together of plastic material, the tread and the riser reinforced by an embedded continuous metallic trellis supplemented by a plurality of metallic rods extending around the angle of the tread and riser and projecting beyond the edges of both, in combination with a pair of stringers having flanges, angle-bars for tying the stringers together, at the flanges, and nuts fastening the said reinforcing rods to the angle-bars.

8. In a fireproof stair structure, a pair of stringers having flanges, angle-tie bars secured thereto, a step tread and riser molded of plastic material, and a plurality of rods extending around the angle of the tread and riser and projecting beyond the edges of both, and nuts fastening the projecting ends of said rods to the angle tie-bars.

9. As a new article of manufacture a tread and riser for stair steps molded of plastic material as an entirety, an embedded trellis passing around the angle thereof and a plurality of embedded rods supplementing said trellis connected to it passing around the angle thereof and projecting beyond the inner edge of the tread and the lower edge of the riser and means for fastening said projecting ends to the stair stringers.

10. In a fireproof structure and in combination, a pair of stringers having flanges on their inner walls, angle-bars one at the junction of the tread and riser for supporting their abutting ends and for tying the stringers together at said flanges, a tread and riser molded of plastic material as an entirety, an embedded trellis passing around the angle thereof, and a plurality of embedded rods supplementing said trellis and passing around the angle thereof, each rod at the inner end of the tread nutted to the angle-bar, the other end of said rod nutted to a separate and corresponding angle-bar for the next tread.

In testimony whereof I have signed my name to this specification in the presence of two subscribing witnesses.

EDWARD EDMUND SCHACHNER.

Witnesses:
HARRY FIELD,
JOHN M. DAVIS.